United States Patent [19]

Hochbein

[11] Patent Number: 4,677,727
[45] Date of Patent: Jul. 7, 1987

[54] ANODE BUTTON FACING MACHINE

[75] Inventor: David E. Hochbein, Sarver, Pa.

[73] Assignee: Aluminum Company of America, Pittsburgh, Pa.

[21] Appl. No.: 714,798

[22] Filed: Mar. 22, 1985

[51] Int. Cl.[4] ............................................. B23B 35/00
[52] U.S. Cl. .................................. 29/402.06; 29/762; 408/1 R; 408/77; 408/234; 409/132
[58] Field of Search .................. 408/77, 79, 88, 95, 408/103, 111, 234, 236, 237, 712, 112, 113, 114, 241 R, 1·R; 409/143, 175, 178, 204, 131, 132; 29/402.06, 762

[56] References Cited

U.S. PATENT DOCUMENTS

| 2,002,727 | 5/1935 | Andren | 408/95 X |
|---|---|---|---|
| 2,004,228 | 6/1935 | Storm et al. | 408/95 |
| 2,392,070 | 1/1946 | Snyder | 408/237 |
| 3,617,142 | 11/1971 | Wane et al. | 408/103 |
| 3,967,687 | 7/1976 | Fowler | 408/112 X |
| 4,009,545 | 3/1977 | Rossborough | 408/88 X |
| 4,011,024 | 3/1977 | Nakano et al. | 408/79 |
| 4,329,094 | 5/1982 | Cooley et al. | 408/77 |

Primary Examiner—Gil Weidenfeld
Assistant Examiner—Glenn L. Webb
Attorney, Agent, or Firm—Elroy Strickland

[57] ABSTRACT

Portable machining apparatus includes a spindle, a milling cutter located at one end of the spindle, and air operated means for rotating the spindle. The apparatus includes further means for supporting the same on a structure containing a portion to be machined, and means for translating the spindle and cutter to and from the structure and portion.

1 Claim, 4 Drawing Figures

ANODE BUTTON FACING MACHINE

BACKGROUND OF THE INVENTION

The invention relates generally to a machining device and particularly to a portable apparatus for machining the surfaces of anode contact buttons employed in Hall cells, though the invention is not limited thereto.

In Hall cells employed for the production of aluminum, a plurality of large carbon anodes are suspended in the electrolyte of each cell by elongated copper bars secured to a large bus located over the cell. Between the bus and the copper bars, and welded to the face of the bus, are metal buttons that are employed to conduct current from the bus to the rod and hence to the anode at the lower end of the rod. Such buttons in an operating cell become pitted and/or oxidized due to arcing between the button and the contacting surface of the anode bar. When this occurs, a substantial voltage drop develops between the pitted or oxidized surface of the buttons and the contacting surface of the anode bar. Any voltage drop, of course, lowers the voltage across the cell, and hence the current flow through the cell, such that the efficiency of the cell in producing metal is adversely affected.

Heretofore, in order to face such buttons, the particular cell had to be isolated electrically from the circuit of adjacent cells so that personnel could work safely on the cell to reface the buttons. The voltage across any particular Hall cell is quite small, i.e., on the order of four or five volts. However, the potential (voltage) of the cell above ground is substantial such that it is potentially dangerous for personnel to work on the cells while the cells are operating.

BRIEF SUMMARY OF THE INVENTION

The present invention is directed to a device for facing or machining a surface on an electrically active conductor, such as the contacting face of an anode button, without electrically grounding the conductor. This is accomplished by a portable apparatus capable of holding and rotating a milling cutter at a suitable RPM. The cutter is held in the chuck of a spindle, and rotated by an air operated motor. The motor is connected to a source of air under pressure by an electrically insulating hose. The apparatus, in addition, includes trunnions that support the apparatus on hooks provided on the face of the conductor. Further elements of the apparatus are discussed in detail below.

THE DRAWINGS

The invention, along with its advantages and objectives, will be better understood from consideration of the following detailed description and accompanying drawings in which.

PREFERRED EMBODIMENT OF THE INVENTION

Figure 1:
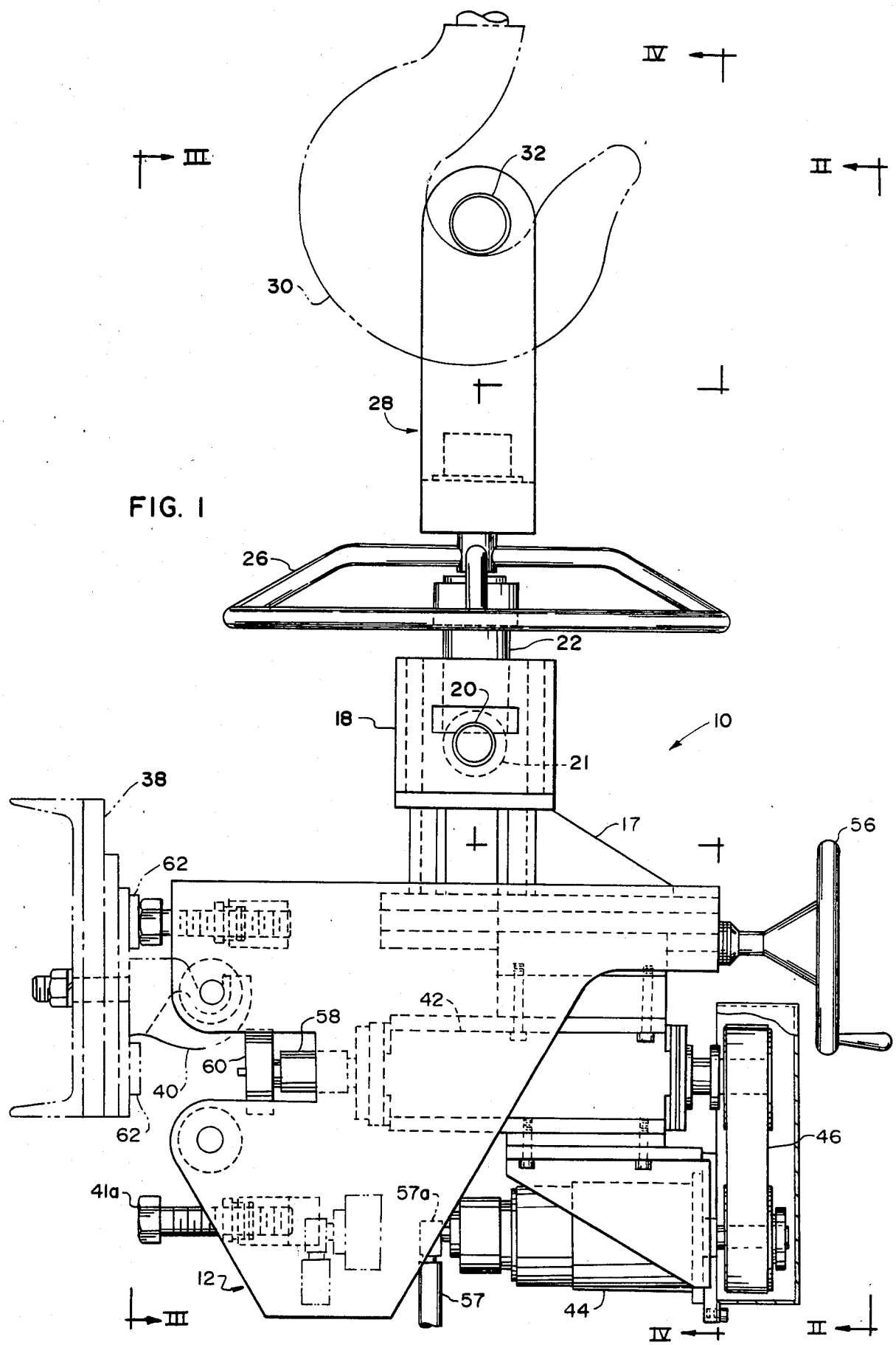
FIG. 1 is a side elevation view of the apparatus of the invention.
Figure 2:
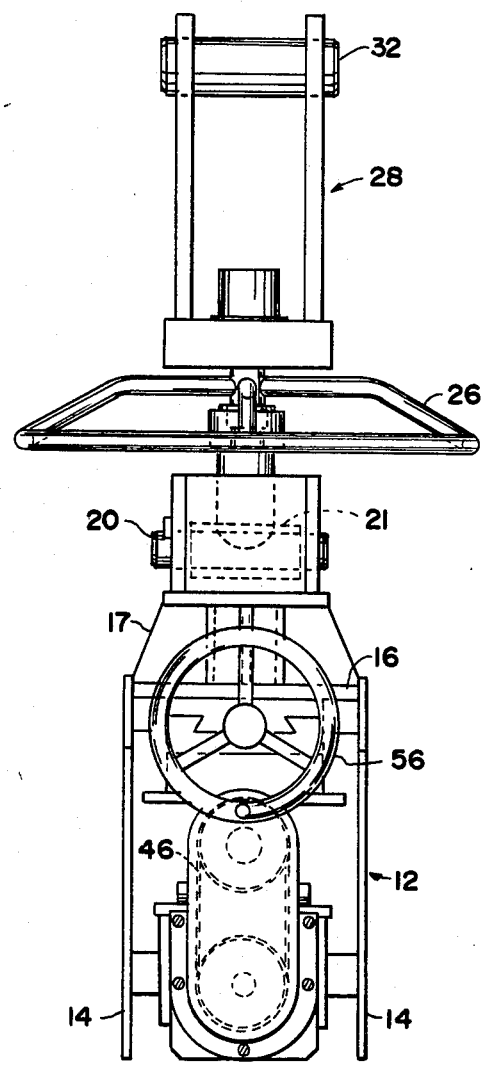
FIG. 2 is a rear elevation view of the apparatus taken on line II—II of FIG. 1.

Referring now to the drawings, FIG. 1 thereof shows an apparatus 10 for effecting the machining-facing operation described briefly above. More particularly, apparatus 10 includes a frame 12 comprised of two spaced apart parallel plates 14 (FIGS. 2 to 4) secured together to form a compact, rigid structure. The upper ends of the parallel plates are secured together by a plate structure 16. On the upper surface of 16 is secured a frame member 17. On the upper edge of member 17 is secured a hollow member 18 that supports apparatus 10 (as thus far described) in a manner that permits the apparatus to pivot about a horizontal bearing 20 (FIG. 4) extending through and suitably secured in opposed walls of hollow member 18.

Above bearing 20 and secured to a sleeve 21 housing the bearing is another hollow member 22 that receives vertically and through its upper end, and through a threaded bore 23 (FIG. 4), a threaded shaft 24. Attached to the shaft is a handwheel 26.

Threaded shaft 24 is suitably rotatably secured in the lower end of a structure 28, as generally designated in the drawings, that is employed to lift and move the apparatus about a pot room, for example. Structure 28 can be employed in the manner depicted in FIG. 1, i.e., a hook 30 of an overhead crane (not shown) is first positioned by the crane such that a workman can then simply locate the hook beneath and then engage a horizontal bar 32 of structure 28, as shown in FIG. 1.

Figure 3:
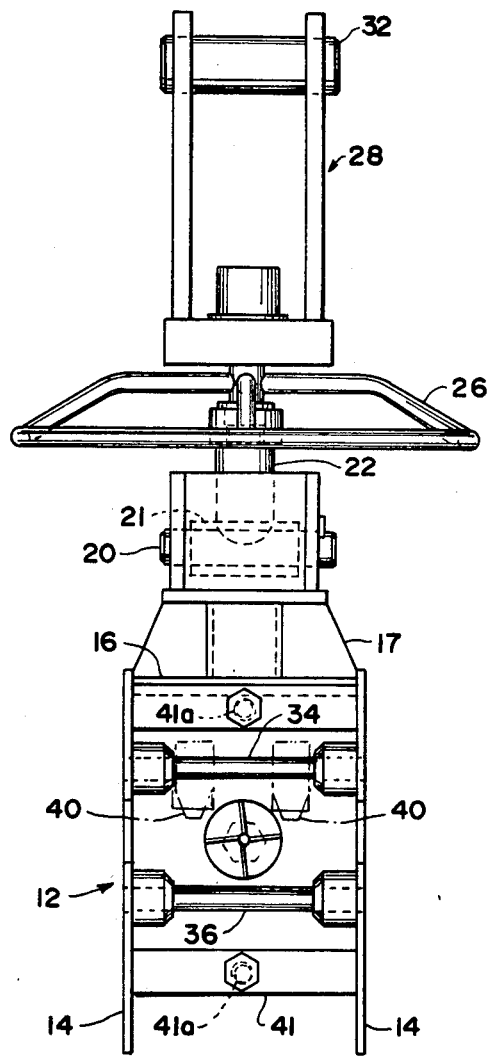
FIG. 3 is a front elevation view of the apparatus taken on line III—III of FIG. 1.

The forward end of the apparatus, which is the left-hand side in FIG. 1, is provided with upper and lower trunnions 34 and 36, respectively. The trunnions are employed to support the apparatus on the face of a current carrying electrical bus 38 (FIG. 1), and to form a part of frame 12. The trunnions, as seen in FIG. 3, extend between and are secured in plates 14. The trunnions support the apparatus on bus 38 by being seated in two, horizontally spaced hooks 40 that are suitably attached to the face of the bus. The hooks are shown in dash outline in FIGS. 1 and 3.

The frame of the apparatus includes, in addition, two horizontal plates 41 (FIG. 3) located above and below trunnions 34 and 36 (at the forward end of the apparatus). In each plate 41 is disposed a threaded shaft or bolt 41a adapted to be translated to and from the face of bus 38 for purposes explained hereinafter.

Figure 4:
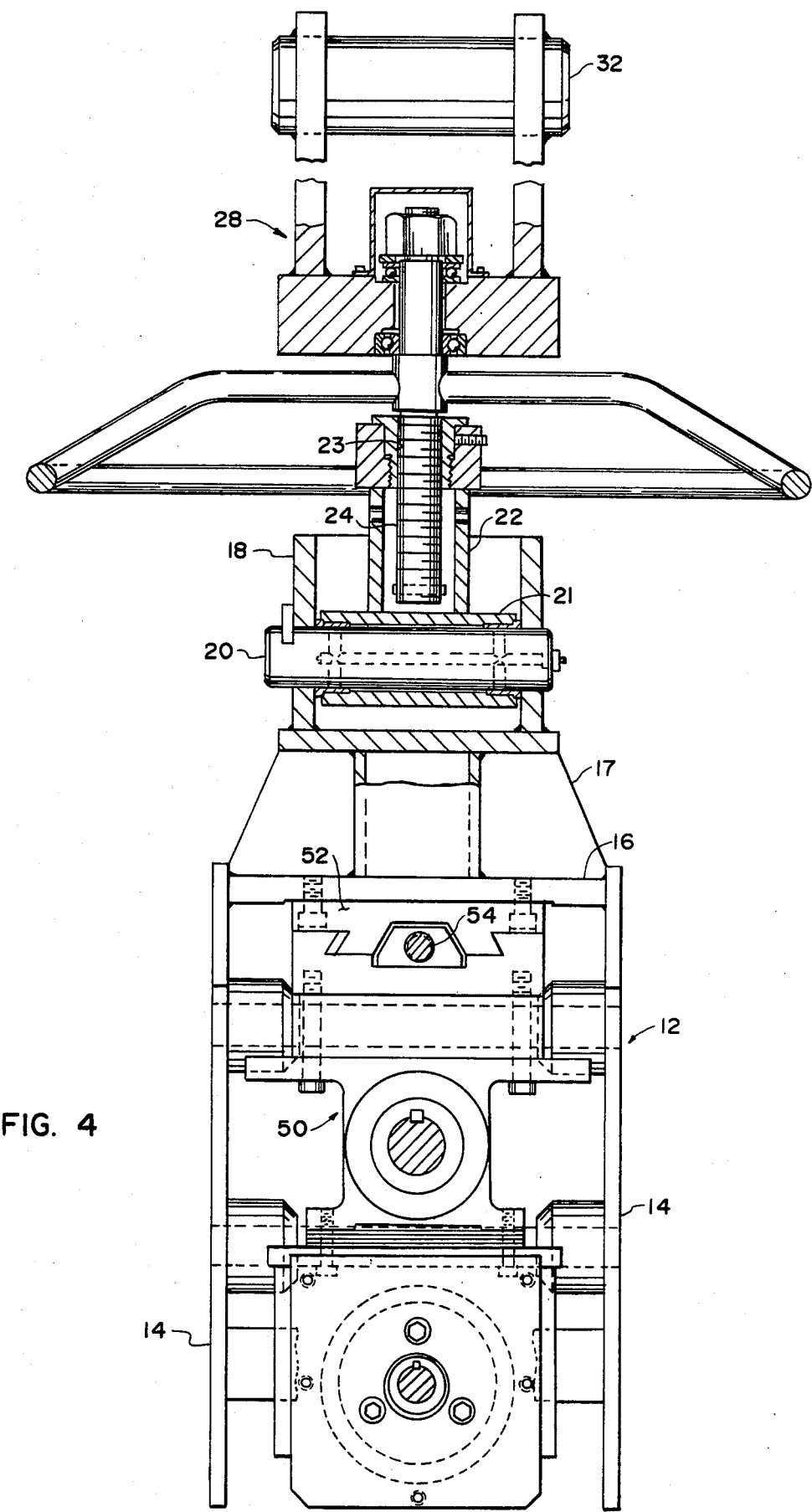
FIG. 4 is a sectional view taken along lines IV—IV in FIG. 1.

Located between plates 14 and beneath upper plate 16 is a spindle 42 and an air operated motor 44, shown mechanically connected to the spindle by a belt 46. Spindle 42 and motor 44 are supported on a carriage 50, as best seen in FIG. 4. The carriage, in turn, still referring to FIG. 4, is supported on a stationary slide or track means 52 suitably attached to upper plate 16. A feed screw 54 threadably engages carriage 50 such that when 54 is rotated, the carriage is translated horizontally on the fixed slide of 52. The screw is rotated by a handwheel 56, visible in FIGS. 1 and 2, connected to the end of the screw that is at the rear of the apparatus.

Motor 44 is supplied with pressurized air via an electrically insulating hose 57 and a suitable fitting 57a, as seen in FIG. 1. The source of the air can be the air that is ordinarily available in plants and factories.

The carriage, spindle, feed screw and air motor form a compact assembly within the space between plates 14 such that the overall size and weight of the apparatus are relatively small.

Mounted on the forward end of spindle 42 is a chuck 58. Chuck 58 receives and secures a cutting device 60, as shown in FIG. 1, for facing vertically spaced and aligned buttons 62 welded to the face of bus 38. As explained earlier, the buses employed to supply current to Hall cells (not shown) utilize metal buttons (62) to electrically contact metal rods (not shown) that support, and supply current to anodes in the electrolyte of the cells. Such rods are clamped tightly against the buttons by clamping devices (not shown) associated with the bus.

The operation of apparatus 10 is as follows. When it is determined that a contact button (62) is in need of facing, because of arcing between the face of the contact and the anode rod, for example, an overhead crane is moved into position over the apparatus. Hook 30 of the crane is then lowered, and a workman places the hook under rod 32 of structure 28.

The workman now orders the crane to be moved to a location over the faulty button, and locates the appropriate trunnion (34 or 36) in hooks 40. The two trunnions are located in vertical relation to chuck 58 and cutter 60 such that both buttons 12 on the bus are made accessible to facing by the cutter, i.e., the upper trunnion 34 is seated in hooks 42 to machine the face of the lower one of the buttons 62, when the upper one of the two buttons requires facing, and the lower trunnion 36 is seated in hooks 40, which locates the cutter opposite the upper button. The apparatus is rotated about bearing 20 to locate the trunnion in the hooks.

To precisely level the apparatus in relation to the bus and button, handwheel 26 is rotated by a workman. Rotation of the handwheel directs threaded shaft 24 into or out of the threaded bore 23 of 22, thereby raising or lowering apparatus 10, as needed.

With the apparatus suitably leveled, the upper or lower one of the shafts 41a is rotated to a position that is firmly disposed against the face of bus 38. In FIG. 1, the upper shaft is so disposed, but is shown engaging the upper button of 62. If the upper button were not present, the forward of the shaft would engage the bus. Firm engagement of the bus by the shaft rigidly fixes the apparatus on the bus and in hooks 40 such that the apparatus resists moving away from the bus when the cutter engages the button for and during the facing operation.

With the apparatus of the invention now placed on bus 38, handwheel 56 is rotated by a workman in a manner to translate carriage 50 toward the bus. The translation is effected by rotation of screw 54 in mating engagement with corresponding threads (not visible) provided in the carriage. The carriage is translated forward until the face of cutter 60 firmly engages the face of button 62. Spindle 42 is now rotated by operation of motor 44 acting through belt 46. Motor 44 is operated by directing a flow of air under pressure to the motor through insulating hose 57. The flow is under control of a suitable valve not shown. The rotation of spindle 44, of course, rotates chuck 58 and cutter 60 to effect the facing operation.

When the facing operation is completed, the valve controlling the supply of air to motor 44 is turned off and the carriage and spindle retracted from their forward position by rotation of handwheel 56. If the other button of the vertically spaced pair is in need of facing, apparatus 10 is rotated about bearing 20 to remove the trunnion presently in place on hooks 40 from the hooks; the other trunnion now is seated in the hooks, again by rotation of the apparatus about bearing 20. The apparatus is again leveled by handwheel 26, the carriage again moved forward to position the cutter against the button and the air motor operated to effect facing.

If, however, the other button of the pair does not require facing, the forward end of the apparatus is elevated about bearing 20 to remove the trunnion from hooks 40, and the crane is operated to remove the apparatus from the vicinity of the two buttons.

The crane itself is electrically insulated from the circuit of the cells and from ground so that it does not electrically ground the bus when the cutter is disposed against the button. Similarly, hose 57, being made of an electrically insulating material, insulates the apparatus and bus from ground. In this manner, contact buttons on the buses of Hall cells are quickly and efficiently faced while the buses are carrying massive amounts of electrical current and while each cell continues to produce metal. And, because of its portability, apparatus 10 is easily moved about a pot room of Hall cells to face contact buttons whenever such facing is needed.

While the invention has been described in terms of preferred embodiments, the claims appended hereto are intended to encompass all embodiments which fall within the spirit of the invention.

What is claimed is:

1. A method of machining a surface portion of an electrical conductor while the conductor is conducting electrical current, the method comprising
   providing hook means on said conductor for receiving a trunion of a portable machining apparatus,
   providing said apparatus with a trunion, and with an air operated motor disposed to rotate a spindle and milling cutter mounted in the spindle,
   insulating the portable apparatus from ground when said motor is connected to a source of pressurized air by using electrically insulating hoses connected between the motor and said source,
   locating said milling cutter adjacent the electrical conductor by disposing the trunion in the hook means,
   translating the spindle towards the electrical conductor until the cutter engages the same, and
   rotating the cutter against a surface portion of the conductor by
   directing a flow of air to the motor through said hoses from the source of pressurized air to rotate the motor and thus the spindle and cutter.

* * * * *